(12) United States Patent
Heenan

(10) Patent No.: US 8,404,171 B2
(45) Date of Patent: Mar. 26, 2013

(54) USE AND PROVISION OF AN AMORPHOUS VINYL ALCOHOL POLYMER FOR FORMING A STRUCTURE

(75) Inventor: Timothy J. Heenan, Vernon (CA)

(73) Assignee: Bolson Materials Intl., Vernon, British Columbia (CA)

( * ) Notice: Subject to any disclaimer, the term of this patent is extended or adjusted under 35 U.S.C. 154(b) by 55 days.

(21) Appl. No.: 12/874,300

(22) Filed: Sep. 2, 2010

(65) Prior Publication Data
US 2011/0060445 A1    Mar. 10, 2011

Related U.S. Application Data

(60) Provisional application No. 61/240,065, filed on Sep. 4, 2009.

(51) Int. Cl.
B29C 41/02 (2006.01)

(52) U.S. Cl. .................................................. 264/308
(58) Field of Classification Search .................. 264/308
See application file for complete search history.

(56) References Cited

U.S. PATENT DOCUMENTS

| | | | |
|---|---|---|---|
| 5,503,785 A | 4/1996 | Crump et al. | 264/40.7 |
| 6,228,923 B1 | 5/2001 | Lombardi et al. | 524/425 |
| 6,547,994 B1 * | 4/2003 | Monkhouse et al. | 264/308 X |
| 6,790,403 B1 | 9/2004 | Priedeman, Jr. et al. | 264/442 |
| 2005/0280184 A1 * | 12/2005 | Sayers et al. | 264/308 |
| 2007/0212644 A1 * | 9/2007 | Yamamoto et al. | 430/270.1 |
| 2010/0003882 A1 * | 1/2010 | Sumi et al. | 442/327 |
| 2010/0201039 A1 * | 8/2010 | Leenders et al. | 264/401 |

FOREIGN PATENT DOCUMENTS

WO    WO-2008078802 A1 *    7/2008

* cited by examiner

Primary Examiner — Leo B Tentoni
(74) Attorney, Agent, or Firm — Teitebaum & MacLean; Neil Teitelbaum; Doug MacLean

(57) ABSTRACT

A process for three-dimensional modeling in which water soluble thermoplastic material is used in an additive deposition process to form a soluble support structure for a three-dimensional model formed via layer-by-layer deposition of the model's geometry. The water-soluble thermoplastic material includes a base of vinyl alcohol. Following the completion of the model, the model is placed in a cold water bath to dissolve the support structure. The water-soluble material can also be used to form soluble model directly.

10 Claims, 2 Drawing Sheets

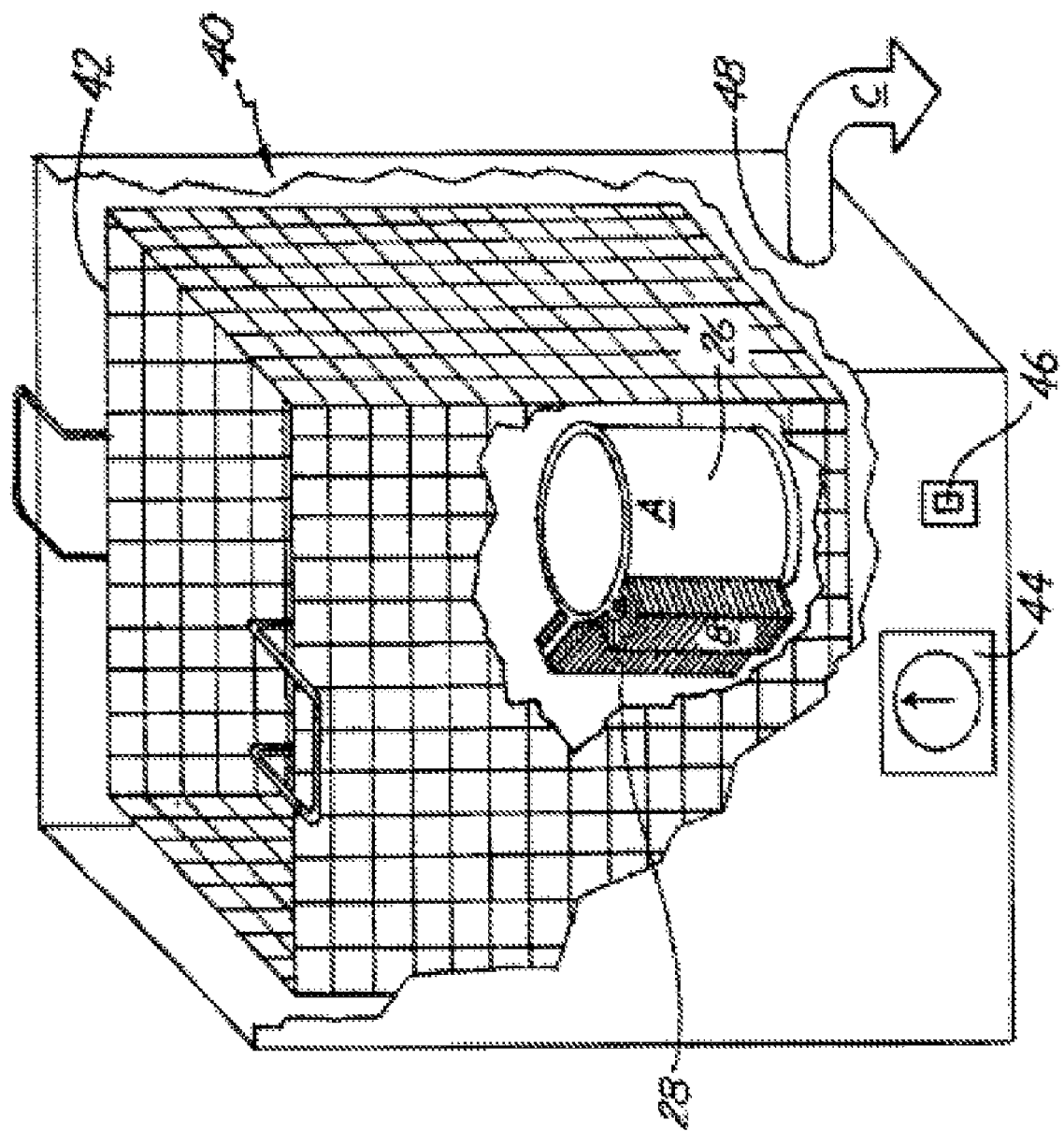

USE AND PROVISION OF AN AMORPHOUS VINYL ALCOHOL POLYMER FOR FORMING A STRUCTURE

CROSS-REFERENCE TO RELATED APPLICATIONS

The present invention claims priority from U.S. Patent Application No. 61/240,065 filed Sep. 4, 2009, which is incorporated herein by reference for all purposes.

FIELD OF THE INVENTION

This invention relates generally to the fabrication of three-dimensional objects using additive process modeling techniques. More particularly, the invention relates to forming three-dimensional objects by depositing solidifiable material in a predetermined pattern and providing support structures to support portions of such a three-dimensional object as it is being built.

BACKGROUND OF THE INVENTION

U.S. Pat. Nos. 6,228,923 and 6,790,403 incorporated herein by reference, assigned to Stratasys Inc of Eden Prairie, Minn., disclose soluble materials used as support structures in fused deposition modelling (FDM™) methods. A layer by layer method of depositing materials for building a model is described in U.S. Pat. No. 5,121,329 incorporated herein by reference, and numerous other patents assigned to Stratasys, Inc. relate to a fused deposition method or FDM™ methods of model deposition.

Additive process modeling machines form three-dimensional models by building up a modeling medium based upon design data provided from a computer aided design (CAD) system. Three-dimensional models are used for functions including aesthetic judgments, proofing the mathematical CAD model, forming hard tooling, studying interference and space allocation, and testing functionality. A common technique is to deposit solidifiable modeling material in a predetermined pattern, according to design data provided from a CAD system, with the build-up of multiple layers forming the model.

In creating three dimensional objects by additive process techniques, such as by depositing layers of solidifiable material, supporting layers or structures must be used underneath overhanging portions or in cavities of objects under construction, which are not directly supported by the modeling material itself.

A support structure may be built utilizing the same deposition techniques and apparatus by which the modeling material is deposited. The apparatus, under appropriate software control, produces additional geometry acting as a support structure for the overhanging or free-space segments of the object being formed. Support material is deposited either from a separate dispensing head within the modeling apparatus, or by the same dispensing head that deposits modeling material. The support material is chosen so that it adheres to the modeling material. Anchoring the model to such support structures solves the problem of building the model, but creates the additional problem of removing the support structure from the finished model without causing damage to the model.

U.S. Pat. No. 6,228,923 in the name of Lombardi et al., assigned to Stratasys, Inc. discloses the use of poly(2ethyl-2-oxazoline) or PEO, a variety of which is commercially available under the name Aquazol®. PEO is a polar water soluble polymer with rheology and mechanical material properties suitable for use in FDM machines as feedstock.

U.S. Pat. No. 6,790,403 in the name of Priedeman, Jr. et al., assigned to Stratasys, Inc., refers to the use of a polymer consisting of a carboxylic acid base and plasticizer, that is soluble in an alkali solution.

One drawback with Carboxylic acid based polymer is that there is not a great range of temperatures in which it can be used before it degrades and cannot be used. The Carboxylic acid polymer operates at less than 240 degrees C. (<470 degrees F.) in FDM™. We have found that if the Carboxylic melt temperature remains above that for an extended period the material will start to degrade and fail in the machine. Another drawback which we perceive with using Carboxylic acid based polymers is that they are alkali soluble. The alkaline solution required to dissolve the Carboxylic based polymer is noxious, corrosive to skin, an irritant to eyes, and is generally incompatible to an office environment wherein the FDM™ are intended to operate.

A further drawback of the carboxylic acid based polymer is that its glass transition point (Tg) is lower than the envelope temperatures required for deposition of polycarbonate (PC) and polyphenylsulfone (PPSF) materials currently used in FDM machines. If used in this application, the carboxylic acid based polymer would soften and would be unable to act as a support structure.

It is an object of this invention to provide a polymer that is water soluble facilitating dissolving the support and making the process less hazardous. FDM machines using the soluble support media described above have software controls controlling support temp so that it cycles around 230 degree C.

It is an object of this invention to use a water soluble polymer having greater operating temperature headroom to work at that temperature.

SUMMARY OF THE INVENTION

In accordance with this invention a water-soluble amorphous vinyl alcohol polymer is used as a deposition modeling support material. A preferred form of the material is commercially available as Nichigo G-Polymer™ from Nippon Gohsei of Japan.

In accordance with an embodiment of the invention, in a process for making a three-dimensional object by dispensing solidifiable modeling material in a predetermined pattern so as to define the three-dimensional object in coordination with dispensing solidifiable support material so as to define a support structure for the three-dimensional object, the support structure thereby having portions thereof in contact with the object, an improvement comprising: forming at least those portions of the support structure contacting the object, or the object itself from an amorphous vinyl alcohol polymer.

In accordance with an aspect of the invention, a mixtre of Nichigo G-Polymer™ and plasticizer such as SEBS is used in a 3-D dispensing modeling machine for forming a support structure or as the model itself.

In accordance with another broad aspect of the invention, SEBS plasticizer is mixed with a polymer in a 3-D dispensing modeling machine. Preferably this is mixed with G-Polymer, however could be used with other polymers suitable for use in 3-D dispensing modeling machines.

BRIEF DESCRIPTION OF THE DRAWINGS

Exemplary embodiments of the invention will now be described in conduction with the drawings, in which:

FIG. 2 is a perspective view (portions broken away) of the model of FIG. 1 in a water bath used in practicing the process of the present invention.

DETAILED DESCRIPTION

Figure 1:
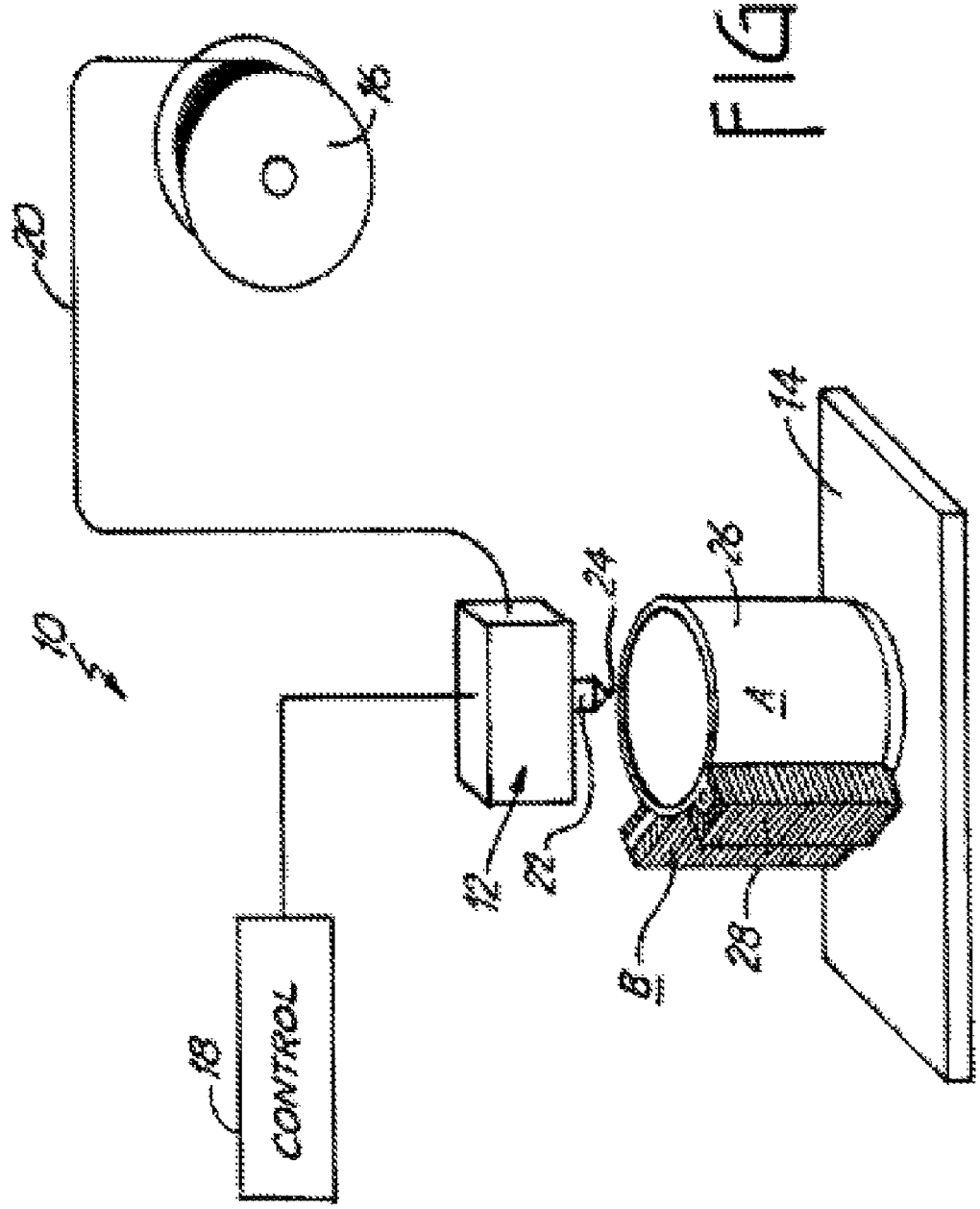
FIG. 1 is a diagrammatic illustration of a model formed by a filament-feed extrusion apparatus wherein the Nichigo G-Polymer™ material of the present invention is used as material B to form a support structure.

Referring now to FIG. 1 an extrusion apparatus 10 is shown for building a model 26 supported by a support structure 28 according to the present invention. The extrusion apparatus 10 includes an extrusion head 12, a material-receiving base 14, a filament supply spool 16 and a control 18. Extrusion head 12 moves in X and Y directions with respect to base 14, which moves in a vertical or Z direction. Supply spool 16 supplies a flexible filament 20 to extrusion head 12. Filament 20 typically follows a rather tortuous path through extrusion apparatus 10, and is advanced towards extrusion head 12 by means of stepper motor-driven pinch rollers. Filament 20 is melted in a liquifier 22, carried by extrusion head 12. The liquifier 22 heats the filament to a temperature slightly above its solidification point, reducing it to a molten state. Molten material is extruded through an orifice 24 of liquifier 22 onto base 14.

The extrusion apparatus 10 of the disclosed embodiment has no positive cut-off valve for stopping flow of the molten material through orifice 24 when a layer or a pass is complete. The flow is stopped by ceasing to advance filament 20 into extrusion head 12. The flow rate at which the molten material is dispensed onto base 14 is determined by a combination of the orifice size and the rate at which filament 20 is advanced into extrusion head 12.

The movement of extrusion head 12 is controlled by control 18 so as to deposit material onto base 14 in multiple passes and layers to build three-dimensional model 26 having a shape determined by stored CAD data and further to build support structure 28 defined so as to physically support the model 26 as it is being built. The model 26 and Its support structure 28 are built up on the base 14 within a build envelope having an environment controlled to promote solidification. A first layer of the deposited material adheres to the base so as to form a foundation, while subsequent layers of material adhere to one other. A base that has been successfully used is a polymer foam removably mounted to a platform. Other materials that may serve as a base include sandpaper formed of a fine wire mesh screen coated with sand and adhered to a platform, a water-soluble wax, a foam plastic material, and an acrylic sheet mounted to a vacuum platen.

A modeling material A is dispensed to form the model 26. G-Polymer™ support material B is dispensed in coordination with the dispensing of modeling material A to form the support structure 28. Common materials used for A are ABS, PC, PC-ABS blends, nylons and less commonly used is PPSF. For convenience, the extrusion apparatus 10 is shown with only one filament supply spool 16 providing a single filament 20. It should be understood, however, that in the practice of the present invention using a filament-feed apparatus such as disclosed herein the modeling material A and the water soluable G-Polymer™ support material B are provided to the extrusion apparatus 10 on separate filament supply spools. The extrusion apparatus 10 may then accommodate the dispensing of two different materials by: (1) providing two extrusion heads 12, one supplied with modeling material A and one supplied with modeling material B; (2) providing a single extrusion head supplied with both the modeling material A and the G-Polymer™ support material B, with a single nozzle for dispensing both materials; or (3) providing a single extrusion head supplied with both materials, with each material dispensed through a separate nozzle.

Modeling material A is typically a thermoplastic material that can be heated relatively rapidly from a solid state to a predetermined temperature above the solidification temperature of the material, and preferably has a relatively high tensile strength. An acrylonitrile-butadiene-styrene (ABS) composition is one particularly suitable modeling material. Other materials that may be used for the modeling material A include a variety of waxes, paraffin, a variety of thermoplastic resins, metals and metal alloys. Glass and chemical setting materials, including two-part epoxies, would also be suitable.

Support material B, in the form of G-Polymer™ can preferably be heated relatively rapidly from a solid state filament to a predetermined temperature above the solidification temperature of the material, and solidify upon a drop in temperature after being dispensed.

The soluble support structure 28 created with support material B may be formed in a known manner, such as disclosed in U.S. Pat. No. 5,503,785, which is hereby incorporated by reference as if set forth fully herein. FIGS. 3-5 of the '785 patent illustrate a removable support structure. As shown in FIG. 1 herein, the support structure 28 may be built entirely out of the support material B. Or, as shown, the G-Polymer™ support material B may form a dissolvable joint between the model formed of modeling material A and a support structure formed of the same material A. The joint can be a release layer or layers, or a thin coating.

After completion of the model 26, the support structure 28 is removed from the model 26 by soaking the model 26 with its attached support structure 28 in a bath 40 containing water. In the embodiment shown in FIG. 2, bath 40 is an ultrasonic, temperature-controlled bath which contains a removable mesh basket 42 for holding the model 26. The temperature of bath 40 is set using a temperature control 44. The water C is an aqueous solution that can be washed down the drain for disposal. The temperature of the solution C in bath 40 can be heated to speed dissolution of support material B. An ultrasonic frequency generator 46 having an on/off switch starts and stops the ultrasonic transmission. The ultrasonic frequency transmission generates air bubbles which assist in dissolving away the support material B by vibrating the model.

Model 26 remains in bath 40 until the support material B dissolves. The basket 42 is then removed from bath 40. The basket 42 can be placed in a sink and the solution C rinsed off of the model 26 with water and washed down the drain. Bath 40 has a drain 48 from which a plug is removed to drain the solution C from the bath 40.

As an alternative to removing support structure 28 from the model 26 by dissolving the support material B in a bath, the support material may be dissolved using water jets operated by hand or by automation.

The base 14 may be removed from the model 26 before placing the model in the bath 40. Alternatively, the base 14 may remain adhered to model 26 as it is placed in bath 40.

Advantageously, by altering the G-Polymer's degree of crystalline structure and branching, the polymer's rheological properties such as melt index, melt point, glass transition and mechanical properties can be varied and used in higher temperature applications such as those encountered in applications for PPSF and PC.

In a preferred embodiment of the invention we altered the G-Polymer by way of additives; for instance plasticizer was added to the G-Polymer to reduce the material stiffness to allow it to be wound in filament form onto standard FDM feedstock reels without breaking. We found that we could toughen Nichigo G-Polymer™ so as to increase its resiliency with the addition of 20-30% of a styrene-ethylene-butylene-styrene block copolymer (SEBS) particle. The nano scale SEBS polystyrene elastomer particle not only allows the material in filament form to bend without breaking, which helps in winding onto spools and loading into machine, but it also improves layer to layer bonding of the material between itself, soluble to soluble; and to the model material, ABS to soluble. An additional benefit of using the elastomer particle to provide flexibility and toughness is that it does not affect the G-Polymer™ glass transition temperature (Tg). Typically plasticisers lower the Tg of the materials to which they are added. Nano scale particles of SEBS were selected because it was found that larger particles allowed fusion between the particles during both processing into filament form and during support deposition in the machine. The resulting fused SEBS impaired dissolution of the Nichigo G-Polymer™ carrier and left a stringy residue attached to the ABS structures being modeled.

Initially we used PEO plasticized material as an additive to Nichigo G-Polymer™ however, it was found that the PEO plasticized material did not provide the layer to layer bonding strength of that demonstrated by the SEBS. As a result, we preferred the SEBS polystyrene elastomer particle. Addition of the SEBS particle however, decreased the melt flow rate of the material in the machine to such a point as to prohibit building of support structures. A melt flow between 4 grams per 10 minutes and 12 grams per 10 minutes of the blend of GP and SEBS in standardized American Society for Testing and Materials (ASTM D1238) testing is preferred for successful depositing the model or the support materials in the FDM process. In order to improve flow rate, the molecular weight of the Nichigo G-Polymer™ was altered by blending it proportionately with lighter grades of Nichigo G-Polymer™ used for film and melt spinning applications. Currently the new molecular wt, 16,000 Daltons, of the Nichigo G-Polymer™ has sufficient flow such that we can vary the SEBS load to improve bonding as required and still have sufficient flow room for other faster or lower temperature applications. The particle size of the SEBS polystyrene elastomer in the water soluble Nichigo G-Polymer™ ranges from 200 to 1500 nm. The average particle size is between this range and is approximately within the range of 600 to 1100 nm and preferably about 900 nm.

In a preferred embodiment SEBS particles are melt blended to ensure even distribution in the carrier Nichigo G-Polymer™. The process involves first creating a master batch of Nichigo G-Polymer™ resin with SEBS particles blended into the a Nichigo G-Polymer™ resin using a twin screw or compounding extruder. The resulting product is then pelletized and reblended with the virgin Nichigo G-Polymer™ resin pellets of the appropriate grade so that both the desired MW target and evenly distributed SEBS particle mix are achieved when the pellet mix is reprocessed through another compounding extrusion process.

Advantageously, Nichigo G-Polymer™ differs from the prior art Carboxylic acid based polymers having much more room, i.e. >700 F, in it's operating envelope before it degrades and cannot be used. The Carboxylic acid polymer operates at less than 240 C (<470 F) in the Stratasys FDM machines.

In a preferred embodiment of this invention, Nichigo G-Polymer™ is the amorphous vinyl alcohol polymer of choice for FDM applications and is suitable for both the deposition model itself and for the support structure. Nichigo G-Polymer™ meets the requirements, which include, melt flow, melt strength, viscosity, Tg point, shrinkage during cooling, strength, modulus, toughness, temperature headroom before degradation, stickiness, ability to withstand high temp residence, solubility, moisture absorbance from atmosphere, and swell behavior as it absorbs moisture.

In summary, forming a model or a support for a model is significantly less challenging when using Nichigo G-Polymer™ which is water soluable and allows higher operating temperatures than the prior art Carboxylic melt.

Furthermore, our blend of, Nichigo G-Polymer™ and SEBS allows our formulation to stick to itself and ABS by virtue of the nano scale elastomers while making it flexible enough to wind, yet stiff enough to feed into the machine, all the while without creating a residual "tubes" of elastomer and hitting the melt flow targets by adjusting the molecular weight. This is a significant advance in the art.

What is claimed is:

1. In a process for making a three-dimensional object by dispensing solidifiable modeling material in a predetermined pattern so as to define the three-dimensional object in coordination with dispensing solidifiable support material so as to define a support structure for the three-dimensional object, the support structure thereby having portions thereof in contact with the object, the improvement comprising:
   a) forming at least those portions of the support structure contacting the object from a water soluble amorphous vinyl alcohol polymer (AVAP); and,
   b) dissolving at least portion of the support structure after the object is formed.

2. A process as defined in claim 1 wherein the AVAP is mixed with additives to reduce the stiffness of the amorphous vinyl alcohol polymer.

3. A process as defined in claim 2 wherein the additive is a plurality of SEBS polystyrene elastomer particles.

4. A process as defined in claim 3 wherein sufficient particles of SEBS are added to form 20-30% of the mixture.

5. A process as defined in claim 3 wherein the range in average particle size is between 200 nm to 1500 nm.

6. A process as defined in claim 3 wherein the mixture provides a flow rate of between 4 grams per 10 minutes and 12 grams per 10 minutes in standardized ASTM testing.

7. A process of forming a structure using an additive process modeling machine comprising:
   building up a modeling medium based upon design data provided from a computer aided design (CAD) system, wherein the modeling medium is an amorphous vinyl alcohol polymer material.

8. A process as defined in claim 7 wherein the model is a support structure for another model.

9. In a process for making a three-dimensional object by dispensing solidifiable modeling material in a predetermined pattern so as to define the three-dimensional object in coordination with dispensing solidifiable support material so as to define a support structure for the three-dimensional object, the support structure thereby having portions thereof in contact with the object, the improvement comprising: forming at least those portions of the support structure contacting the object or the object from a water soluble amorphous vinyl alcohol polymer, wherein the AVAP is mixed with additives to reduce the stiffness thereof and wherein the additives are elastomer particles having an average size between 200 nm and 1500 nm.

10. A process as defined in claim 9 wherein the additive is a plurality of SEBS polystyrene elastomer particles.

* * * * *